June 13, 1967
J. R. YOUNKIN
3,324,733
GYRO SYSTEM
Filed Sept. 3, 1964
5 Sheets-Sheet 1
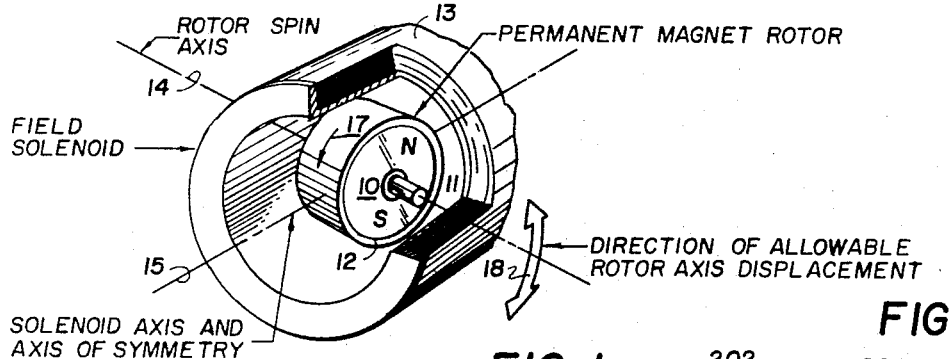
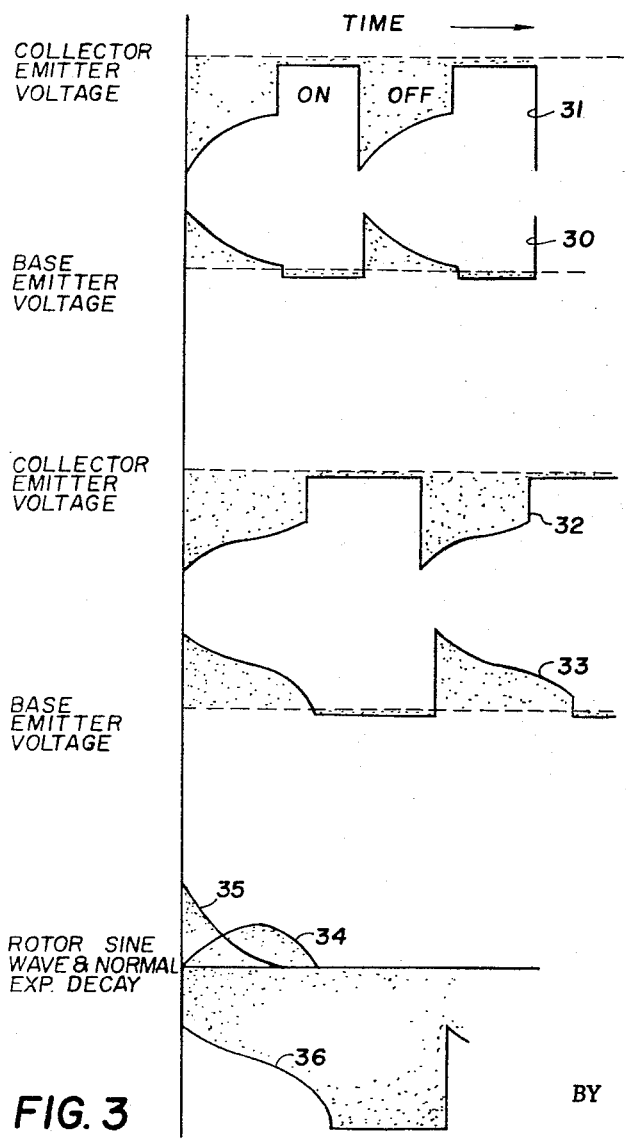
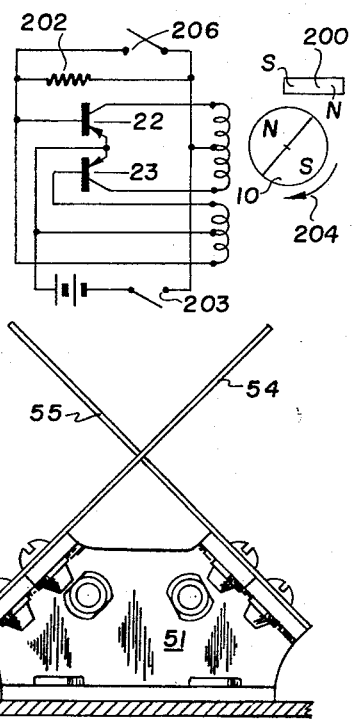
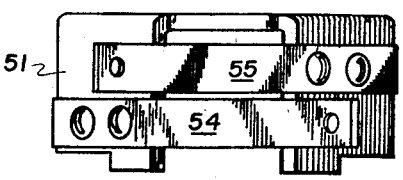
INVENTOR
JAMES R. YOUNKIN
BY *D. Carl Richards*
ATTORNEY June 13, 1967  J. R. YOUNKIN  3,324,733
GYRO SYSTEM Filed Sept. 3, 1964  5 Sheets-Sheet 2

INVENTOR
JAMES R. YOUNKIN

BY

ATTORNEY

June 13, 1967 J. R. YOUNKIN 3,324,733
GYRO SYSTEM
Filed Sept. 3, 1964 5 Sheets-Sheet 3

INVENTOR
JAMES R. YOUNKIN

BY
ATTORNEY

United States Patent Office 3,324,733
Patented June 13, 1967

3,324,733
GYRO SYSTEM
James R. Younkin, Mineral Wells, Tex., assignor, by mesne assignments, to Thurman & Younkin, Inc., a corporation of Texas
Filed Sept. 3, 1964, Ser. No. 395,361
20 Claims. (Cl. 74—5.7)

This invention relates to a reference means for guidance systems and more particularly to a solenoid-driven rotor mounted for rotation on an axis perpendicular to the axis of the solenoid and rotationally displaceable within and relative to the solenoid with reference to the axis of the solenoid.

This application is a continuation-in-part of application Ser. No. 293,339, filed July 8, 1963, and now abandoned.

Motor-driven gyroscopes are well-known wherein both a motor stator and rotor are gimbal-mounted with driving energy being fed through the gimbals to the motor. The present invention is directed to the provision of a relatively simple mechanical structure in which the necessity of transmission of driving power through at least one set of gimbal bearings is eliminated. The invention further provides for relatively inexpensive construction of a position reference unit of precision as to merit its use in guidance of crafts which heretofore have required far more complex, more expensive structures.

In accordance with one aspect of the present invention, there is provided a gyro system in which a hollow solenoid forms a stator for a gyro motor. A permanent magnet rotor is mounted as to be angularly dsplaceable on the solenoid axis and rotatable in the solenoid field on an axis perpendicular to the axis of the solenoid. Means are provided for supporting the rotor to permit said angular displacement by rotation of the solenoid on its axis relative to the rotor. Means are provided for detecting the angular displacement.

In a more specific aspect, there is provided a permanent magnet disk rotor mounted within a solenoid on an axis perpendicular to and intersecting the solenoid axis. The solenoid is energized with alternating current to establish an alternating magnetic field in the region of the rotor.

The solenoid includes multiple center-tapped windings forming a part of a synchronized free-running multivibrator for periodically reversing the field within the solenoid. In a further aspect the gyroscope is provided with means to assure rotation of the rotor in a preferred direction.

For a more complete understanding of the present invention and for further objects and advantages thereof, reference may now be had to the following description taken in conjunction with the accompanying drawings in which:

FIGURE 1 diagrammatically illustrates the operation of the present invention;

FIGURE 3 illustrates waveforms involved in the operation of the systems of FIGURES 1 and 2;

FIGURE 7 illustrates a spring mounting structure;

FIGURE 8 is a top view of the unit of FIGURE 7;

FIGURE 17 illustrates a starting system, involving prepositioning of the rotor.

Figure 4:
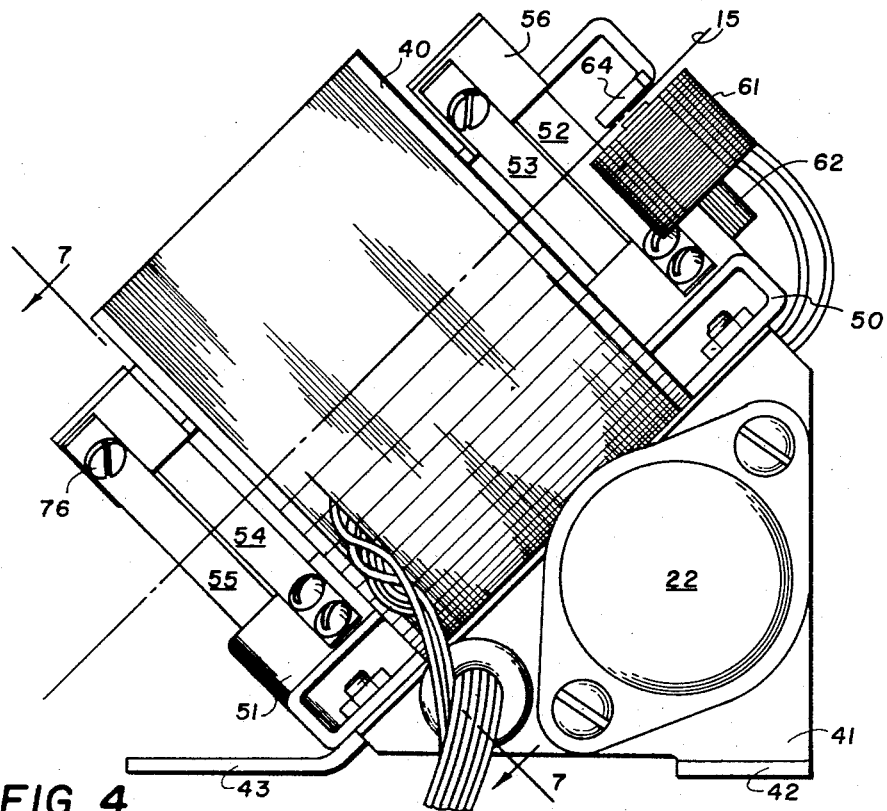
FIGURE 4 is a side elevation view of one embodiment of the invention.

FIGURE 1 diagrammatically illustrates a gyroscope in which a permanent magnet rotor 10 is mounted on a shaft 11. The rotor 10 is a two-pole rotor comprising a permanent magnet disk mounted inside a housing 12. The shaft 11 is journaled in bearings in the rotor and is positioned at rotor spin axis 14. The spin axis 14 is perpendicular to the axis 15 of the solenoid 13. The solenoid 13 has multiple windings. Current supplied to a main winding of solenoid 13 is periodically reversed so that the rotor 10 may be driven synchronously at relatively high speeds by the magnetic field produced by the solenoid. The rotor 10 is driven under the influence of the magnetic field of the solenoid 13 in the direction of arrow 17. The shaft 11 is mounted to permit displacement of the rotor axis 14 about solenoid axis 15 in the directions of arrow 18, in response to a change in attitude of a frame on which the gyro is mounted.

Figure 2:
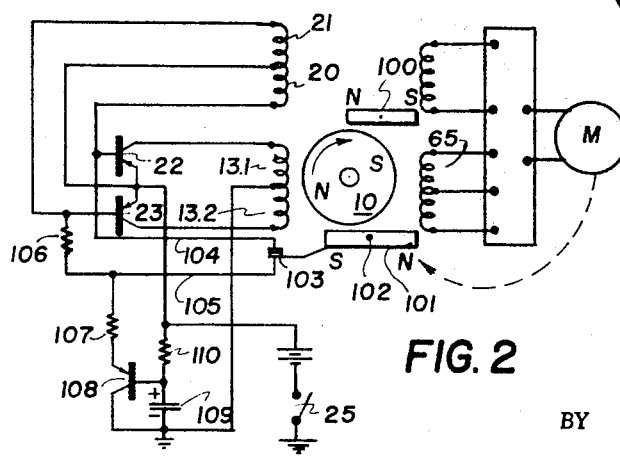
FIGURE 2 is a circuit diagram for the system of FIGURE 1.

FIGURE 2 illustrates an electrical circuit for starting and driving the rotor 10. Also included are sensing and reference coils. The circuit is a magnetically coupled free-running multivibrator which, in accordance with the present invention, is triggered by voltages induced by rotation of the magnet in rotor 10. The main windings of solenoid 13 comprise a center-tapped coil of two windings 13.1 and 13.2 having a common terminal connected to ground. One extremity of winding 13.1 is connected to the collector of a transistor 22. The base of the transistor is connected to an extremity of control winding 20, the other extremity of which is connected to control winding 21 and to the emitter electrodes of a transisor 22 and a transistor 23. The base of transistor 23 is connected to the extremity of control winding 21. The collector of transistor 23 is connected to the second extremity of the winding 13.2. The emitters of transistors 22 and 23 are connected to a source 24 of direct current, the negative terminal of which is connected to ground by way of a master switch 25.

When the gyro of FIGURE 1 is in the running mode, the collector and the base terminals of the two commutating transistors 22 and 23 are connected to the field coils 13.1 and 13.2 in push-pull relation. The phasing of the signals, inductively coupled to the base terminals through windings 20 and 21, is regenerative. The network including the air wound field coils 13.1 and 13.2, the commutating transistors 22 and 23, and the control coils 20 and 21 constitute a free-running multivibrator in which the coupling is inductive. The operation is comparable with that of a more conventional RC coupled multivibrator. When transitsor 22 is conducting, the base of transistor 23 is maintained positive. Thus, transistor 23 is biased off by means of the inductive coupling between the primary winding 13.1 and the control winding 21 connected to the base of transistor 23. Since the field coils 13.1 and 13.2 surround little if any iron, no saturation effects are present and a square wave voltage in the primary winding 13 will cause an exponentially decaying secondary voltage in the control windings 20 and 21.

FIGURE 3 shows the collector-base waveforms that exist in the circuit of FIGURE 2 when operating as a free-running multivibrator with the rotor 10 stationary. The exponential decay of the base-emitter voltage is shown in the curve 30 with the curve 31 representing the collector-emitter voltage. The drive to sustain conduction in a given transistor decreases exponentially although the base voltage waveforms, during conduction, will not exhibit this change. When the drive decreases to a sufficiently low level, the system will undergo transition and the transistor 22 will be rendered non-conductive with transistor 23 being rendered conductive during the period that transistor 22 is non-conductive.

The circuit thus far described will operate as a free-running multivibrator with the rotor 10 stationary. In starting the rotor into motion, it is necessary to make certain that the rotation is in a preselected direction such as represented by the arrow rather than in the opposite direction. In order to accomplish this, a starting circuit is provided which involves use of pre-positioning magnets 100 and 101. As hereinafter described, magnet 100 is mounted on top of the rotor outside the solenoid 13 in a fixed relation with respect to the solenoid. On the other hand, the magnet 101 is mounted on springs as to be pivoted about axis 102 with relative orientation of the poles of magnets 100 and 101 and the rotor 10 in general as indicated in FIGURE 2. The magnets react with the polarized rotor 10 to make certain that the rotor will always stop in a certain orientation within the solenoid 13, and are so oriented that the south pole of the rotor 10 will be uppermost, with the north pole of rotor 10 adjacent to the south pole of magnet 101. Reaction between magnet 101 and the rotor magnet causes switch 103 to be closed when the rotor north pole is below the center line of the solenoid. One terminal of switch 103 is connected by way of conductor 104 to the base of transistor 22. When closed, conduction is formed from transistor 22 to ground through resistor 107 and transistor 108 in preference to transistor 23. The second contact of the switch 103 is connected to the base of transistor 23 by way of conductor 105 and resistor 106. It is also connected to resistor 107. The base of transistor 108 is connected to one terminal of a storage capacitor 109, the other terminal of which is connected to ground. The base of transistor 108 is connected by way of a timing resistor 110 to the B+ terminal of the battery 24.

The magnets 100 and 101 serve to bring the rotor 10 to rest at an orientation such that switch 103 will always be closed. With the switch 25 open, the voltage across condenser 109 is zero so that the transistor 108 may readily conduct when switch 25 is closed. Condenser 109 is charged through resistor 110 as rotor 10 attains speed. At low speeds of the rotor, the magnet 102 oscillates to open and close switch 103. When switch 103 is closed, the collector circuit of transistor 22 is conductive, since the base of transistor 22 is connected to ground through resistor 107 and the conducting transistor 108. When switch 103 is open, the collector circuit of transistor 23 is conductive, since current flows from the base of transistor 23 through high resistor 106 so that the circuit initially favors resistors 106 and 107 and conducting transistor 108. When transistor 22 conducts, it produces a magnetic field in the solenoid 13 that will start the rotor 10 in the direction of arrow A. As the condenser 109 becomes fully charged, transistor 108 is shut off so that the starting circuit is ineffective after the period of time determined by the relative values of resistor 110 and condenser 109. When transistor 108 ceases to conduct, the multivibrator circuit becomes symmetrical. This is timed so that the rotor is then approaching running speed. With this start circuit, even if the rotor stops at 180° or is backwaards, it will also start and run in proper direction.

A pair of pick-off coils 60 and 61 are shown in controlled relation with respect to the rotor 10 and inductively coupled to windings 13.1 and 13.2. A center-tapped reference winding 65 is also shown as coupled to the rotor 10 and to the windings 13.1 and 13.2 to provide a phase reference for the voltages induced in coils 60 and 61. Coils 60 and 61 are connected in series opposing relationship for reasons which will hereinafter be described.

When the rotor 10 is driven, a sinusoidal back EMF is generated, which voltage is then added to the voltage waveforms 30 and 31 of FIGURE 3. It will be noted that the collector-emitter voltage waveform 32 representing the sum of the voltages, is almost the same waveshape during the on period as during the off period so that the transition from conduction to non-conduction is controlled or triggered by the EMF of the rotating magnet in rotor 10. The system is thus somewhat related to a conventional free-running multivibrator which is synchronized by a sinusoidal signal. It should be understood that the waveforms 32 and 33 of FIGURE 3 are of the type observed when in the full speed condition. When the rotor turns at slower speeds, as during the starting period, the sine wave of the rotor will trigger the multivibrator on multiple numbers of half cycles.

In FIGURE 3, the curve 34 is representative of one-half cycle of the rotor induced sine wave. The curve 35 represents the exponential decay and curve 36 represents the sum of the two, the latter also being shown in the curve 33.

Figure 6:
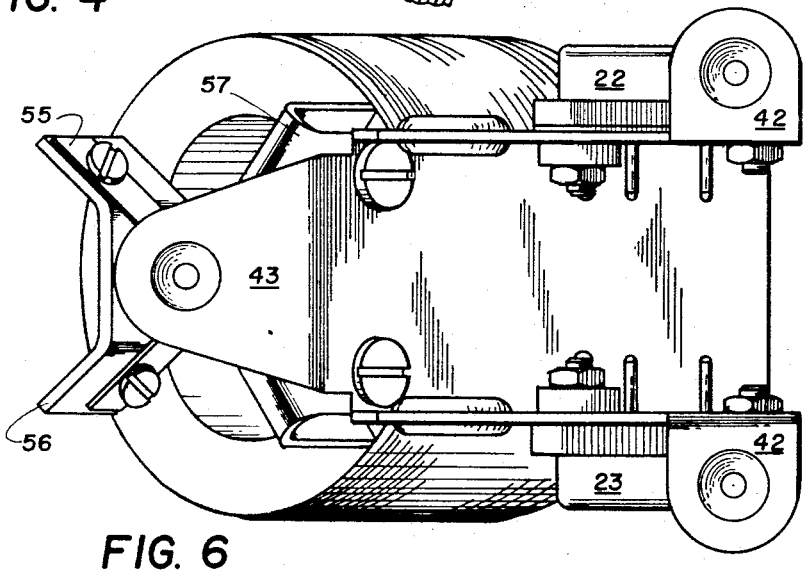
FIGURE 6 is a bottom view of the embodiment of FIGURE 4.
Figure 5:
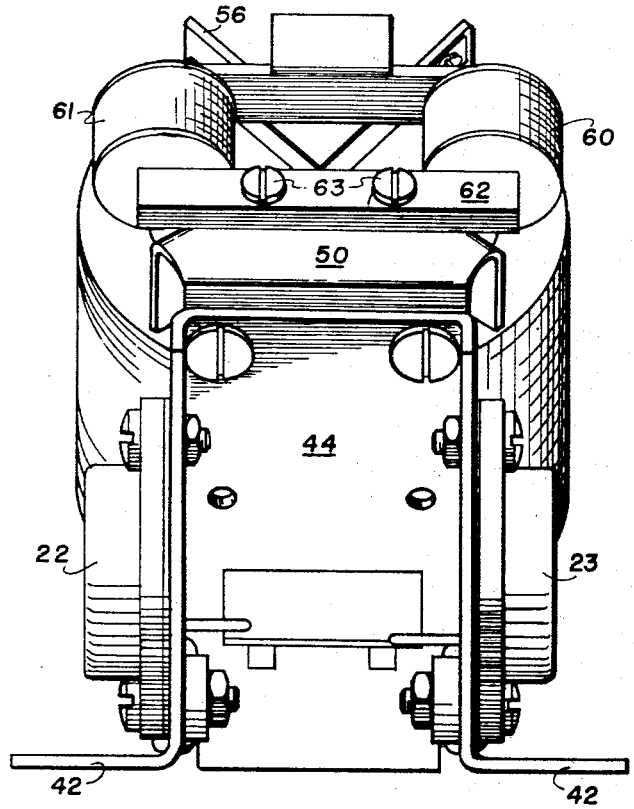
FIGURE 5 is a front elevation view of the embodiment of FIGURE 4.

An embodiment of the invention is shown in FIGURES 4–6. In this embodiment, the solenoid windings 13.1, 13.2, 20, and 21, are wound onto a form 40. The latter form is secured to a frame 41 with the axis 15 inclined at an angle of 45° with respect to the base plates 42 and 43 of the frame 41. As best shown in FIGURE 5, the frame 41 is formed from a sheet in which a central web section 44 forms a surface to which the coil form 40 is secured. Transistors 22 and 23 are mounted on the side plates of the frame 41. The coil form 40 is positioned between a pair of spring mounting brackets 50 and 51. A pair of pivot springs is mounted on each of brackets 50 and 51 to provide a rotational support for a gimbal-rotor assembly extending through the solenoid 13. As best seen in FIGURE 4, a spring 52 is mounted on bracket 50 extending upwardly therefrom parallel to the upper face of the coil form 40. A second spring 53 similarly is mounted on the bracket 50. Springs 54 and 55 are mounted on bracket 51. The lower ends of springs 52–55 are secured by suitable screws to the brackets 50 and 51 respectively. The springs are crossed at angles of 90°. The upper ends of springs supoprt the gimbal-rotor assembly 56.

A pair of pick-off coils 60 and 61 are mounted on a U-shaped magnetic core 62 which is secured as by screws 63 to the bracket 50. The upper faces of the lamination on which coils 60 and 61 are mounted are located in a plane passing through axis 15 and are in confronting relation to the lower surface of a magnetic shunt mounted on cross bar 64 forming a part of the gimbal-rotor assembly 56. The axes of coils 60 and 61 are perpendicular to axis 15 and to the displacement axis 14 of FIGURE 1.

FIGURE 7 illustrates, in detail, the lower bracket 51 and the supporting springs of the gimbal-rotor assembly. The springs 54 and 55 are secured to flanges on the bracket 51 which are inclined one to the other such that the angle subtended is 90°. FIGURE 8 shows the bracket 51 and the springs 54 and 55 as viewed from the top.

Figure 10:
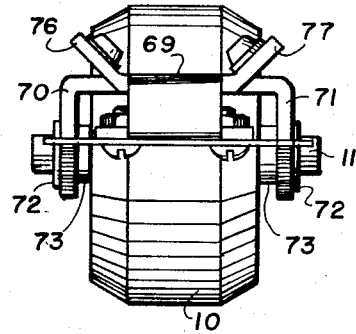
FIGURE 10 is a front view of the assembly of FIGURE 9.
Figure 9:
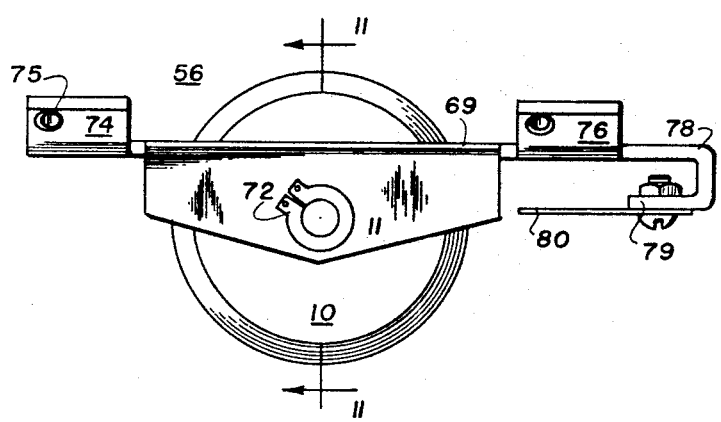
FIGURE 9 is a side view of the rotor assembly.

FIGURES 9 and 10 illustrate the gimbal-rotor assembly 56 in which the shaft 11 extends through downwardly-depending side flanges 70 and 71 of a frame 69. The shaft 11 is locked in by snap rings 72. Flanges 70 and 71 are somewhat resilient and bear against spacers 73 which in turn contact the inner race of the bearings 10.4 and 10.5 to preload such bearings. Tab 74, FIGURE 9, is provided with a hole 75 and a nut to receive the screw 76 of FIG-URE 4 for securing the upper end of the spring 55 thereto. In a similar manner, the spring 54 is secured to a second tab extending in the opposite direction of tab 74.

The front end of the frame 69 has a pair of upwardly and outwardly extending tabs 76 and 77. Frame 69 also has a forwardly-extending bracket 78 which breaks downwardly and returns in the direction of the rotor 10 to form the cross bar 64. Bar 64 supports the shunt 80. Spring 53 is secured to the tab 76. Spring 52 is secured to the tab 77. With the springs thus secured to the tabs 74, 76, and 77, the rotor 10 may be displaced perpendicular to the shaft 11 by rotation on springs 52–55.

Figure 11:
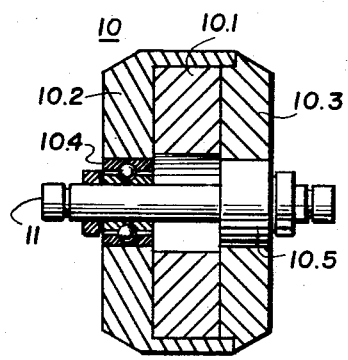
FIGURE 11 is a sectional view of the rotor as taken along the line 11—11 of FIGURE 9.

In FIGURE 11 the rotor is shown in section and comprises a central magnet disk 10.1 in a cup 10.2. A cap 10.3 is secured to the cup 10.2 to maintain the magnet 10.1 in position and to form a short, smooth surfaced, cylindrical rotor. The shaft 11 extends through bearings 10.4 and 10.5 so that the rotor is free to rotate on the shaft 11.

With the rotor 10 spinning in its normal position, the shunt 80 is spaced equidistant from the ends of the core 62 around which coils 60 and 61 are disposed. Coils 60 and 61 are identical in construction and are to be connected in a detecting circuit in series-opposing relation. Any change in angular position of the rotor spin axis within the solenoid will result in displacement of the shunt 80, thus unbalancing the circuit involving coils 60 and 61. The unbalance thus produced may be employed in a suitable control system for effecting the desired control in response to such signal.

In one embodiment of the invention, the rotor had a maximum dimension in the plane of shaft 11 of 1.150 inches. The solenoid had an inner diameter of 1.200 inches and an outer diameter of about 1.75 inches. The solenoid windings included main field windings 13.1 and 13.2 of 350 turns each of No. 26 wire. The control windings 20 and 21 each comprised 350 turns of No. 36 wire. Over the top of the latter two circuits there was provided a center-tapped winding 65 of 1000 turns of No. 46 wire to provide a reference signal for the sensing system.

The rotor 10 preferably is positioned symmetrically within the solenoid. The frame 41 may be relatively simply formed from sheet metal such as aluminum or other non-magnetic material. The coils 60 and 61 were mounted on spools of the order of one-fourth inch inside diameter and one-half inch outside diameter. They were each formed of 2000 turns of No. 40 wire. The coils 60 and 61 were positioned as to be symmetrical with respct to the field established in the solenoid so that the output signal therefrom is at the same frequency as the commutation provided by the circuit of FIGURE 2. The rotor, while preferably positoned midway of the length of the solenoid, may be located at other positions so long as it is in the field of influence of and magnetically coupled to the solenoid 13. The pick-off coils 60 and 61 preferably are operated at the carrier frequency generated by the solenoid. However, they may also be separately excited from a different source coupled to the core 62 if desired. The flexible pivots involving springs 52–55 may be replaced with conventional gimbals supported on bearings.

Figure 12:
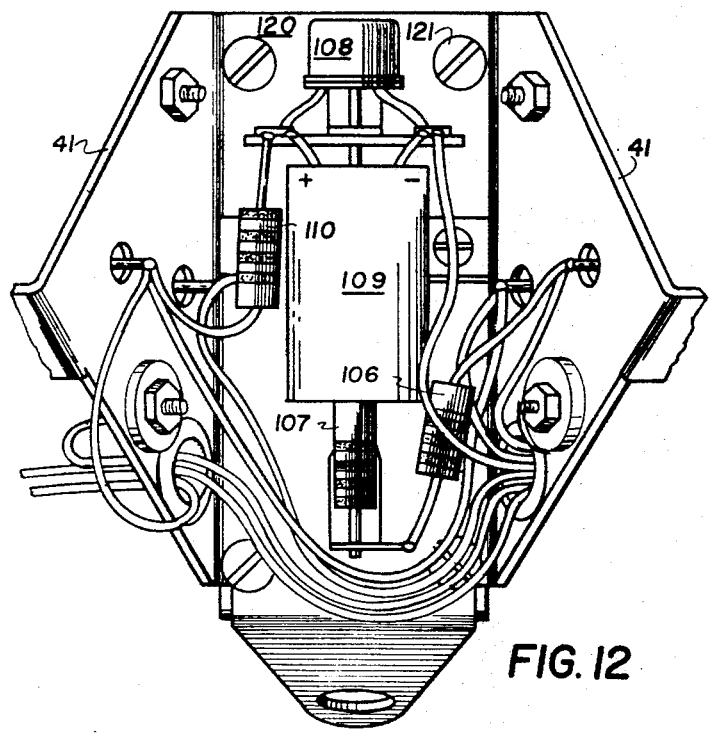
FIGURE 12 is a partial bottom view of the unit of FIGURES 4–6 with the side flanges flared outwardly more clearly to show the starting circuit module in place.

In FIGURE 12 the underside of the unit of FIGURE 4–6 has been shown with the side flanges 41 flared outwardly and partially truncated in order to show the mounting relationship of a starting module which comprises an insulating sheet 120 secured to the bottom bay or surface of the frame 41 as by screws 121. The resistors 106, 107, 110, and the transistor 108 are shown mounted on the plate 120.

Figure 13:
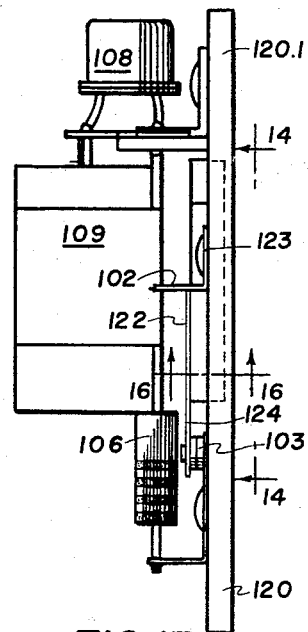
FIGURE 13 is a side view of the starting circuit module of FIGURE 12.

The module is shown in FIGURE 13 with the plate 120 providing support for the circuit elements. The magnet 101 is shown supported by a spring 122 which is secured by screws 123 to the plate 120 supporting the magnet 101 for limited rotation about the axis 102. The spring 122 is provided with an extension 124 which carries the upper contact of the switch 103. With the face of the plate 120 adjacent to the solenoid 13, the magnet 101 will then be permitted to oscillate in response to movement of the rotor at low speeds cyclically to close start commutator switch 103 and thus preferentially condition the multivibrator during starting up.

Figure 16:
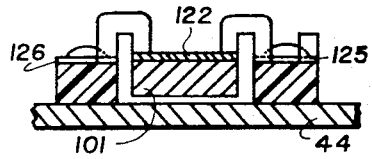
FIGURE 16 is a sectional view taken along line 16—16 of FIGURE 13.
Figures 14, 15:
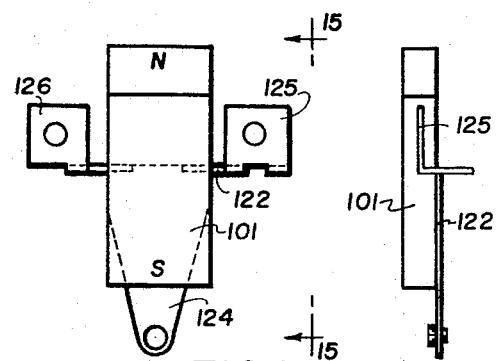
FIGURE 14 is a view of the starting magnet and its mounting viewed from line 14—14 of FIGURE 13.
FIGURE 15 is a side view of the magnet and its mounting as viewed from line 15—15 of FIGURE 14.

The mounting means for the magnet is shown in more detail in FIGURES 14–16. The plates 125 and 126 of the spring 122 provide bearing surfaces on the insulating plate 120. The spring action is provided by the cutout sections as viewed in FIGURE 16. It will be noted in FIGURES 15 and 16 that the plates 125 and 126 are positioned below the surface of the magnet 101 and that there is clearance between the surface of the magnet 101 and the plate 44 of the mounting bracket. Thus, oscillation sufficient for opening and closing switch 103 is permitted.

In FIGURE 17 another starting circuit is shown in which the rotor 10 is mounted in the solenoid 13. A permanent magnet 200 is mounted on or adjacent to the outer surface of the solenoid 13. The south pole of magnet 200 is positioned above the axis of the rotor 10 and is closer thereto than the north pole. The multivibrator circuit including transistors 22 and 23 is similar to the circuit of FIGURE 2 except that a resistor 202 is connected between the base of transistor 22 and the center tap of the main winding on solenoid 13. Resistor 202 causes transistor 23 to conduct when switch 203 is closed. The resistor 202 also prevents free-running oscillation of the circuit. The rotor 10 will initially rotate in the direction of arrow 204. When the rotor 10 passes through a position such that the magnets thereof are in alignment with the axis of the coil 13, the voltage induced in the coil will trigger the multivibrator circuit. Every time the rotor 10 passes the position of alignment, the multivibrator is triggered. A switch 206 is shown connected as to shunt resistor 202 when it is closed. The switch may be closed either manually or automatically when the rotor reaches full speed, although the system will operate satisfactorily, if the resistor 202 is retained in the circuit at all times. A starting circuit of the type illustrated in FIGURE 17 preferably will include the switch 206.

Figure 18:
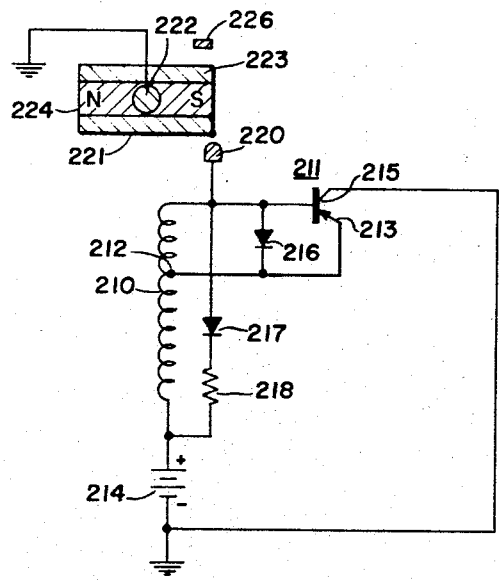
FIGURES 18 and 19 illustrate a simplified starting system.
Figure 19:
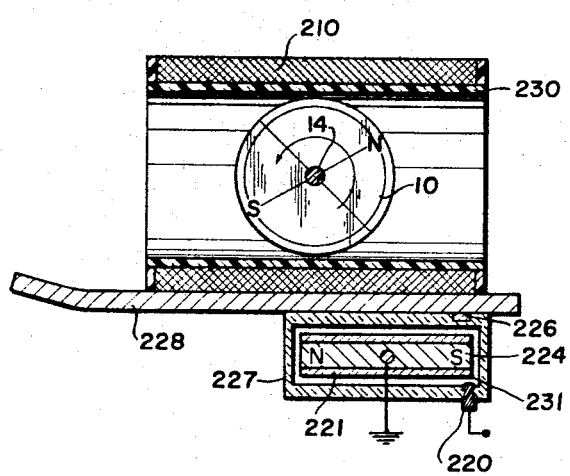

A preferred system for starting the rotor is illustrated in FIGURES 18 and 19. The system is preferred because of its simplicity, as compared with the system of FIGURES 2 and 17. In this system, the coils for driving the rotor 10 comprise a single winding 210 having one terminal connected to the base of a transistor 211, a midtap 212 connected to the emitter 213 of transistor 211, and the other extremity connected to the positive terminal of a D.C. source 214. The negative terminal of source 214 is connected to ground. The collector 215 of transistor 211 is connected to ground. A diode 216 is connected between the base of the emitter of transistor 211 to serve as a reverse voltage eliminator for the transistor. A diode 217 and a resistor 218 are connected in series between the positive terminal of battery 214 and the base of transistor 211 to serve as a transient suppressor.

The base of the transistor 211 is connected to a mechanical commutator for starting. The commutator includes contact 220. The contact 220 is positioned adjacent to a cylinder 221. The cylinder 221 is mounted for rotational motion on shaft 222. The cylinder 221 comprises a non-magnetic case 223 made of brass or the like which encases a permanent magnet 224. The cylinder adds mass and thus limits the frequency response of the mechanical commutator. The cylinder 221 is connected electrically to ground. A magnetic member 226 is supported adjacent to the cylinder at one end thereof. Member 226 attracts the moving magnet when the gyro is running at high speed to hold the contact open.

As shown in FIGURE 19, the cylinder 221 is mounted in an insulating housing 227 which is secured to the plate 228 on which the rotor assembly is mounted. The rotor is mounted for rotation on axis 14 inside the hollow cylinder formed by the coil 210 and a spool 230 on which the coil is wound. It will be noted that the magnet 224 is positioned with one pole thereof closer to rotor 10 than the other pole. In the latter case, the north pole is more closely adjacent to the rotor 10 than the south pole. In the position indicated in FIGURE 19, the south pole of the rotor 10 attracts the north pole of the magnet 224 upwards. The rotor is pre-positioned to go through an initial long power stroke of about 140° when power is turned on. The end 231 of the cylinder 221 will be drawn down into contact with the contact 220. When this circuit is completed, the transistor base is connected to ground, causing the transistor to conduct, thus fully energizing coil 210. As the coil is energized, a magnetic field produced within the coil serves to move the rotor 10 so that the north pole of the rotor will turn to a position adjacent the north pole of the magnet 224. This will open the circuit through the contact 220 permitting the rotor to travel on to the point at which the south pole attracts the magnet 224.

Coil 210 is connected to the transistor 211 to form an oscillator circuit, the frequency of which corresponds with the desired speed of the rotor 10. The oscillator continues to apply current to the coil 210 so that the rotor 10 will be driven up to speed. As the speed increases, the inertia of the magnet 224 is such that it cannot oscillate in synchronism with the varying magnetic forces from the rotor 10. Thus, the south pole of the magnet 224 is attracted to the magnetic member 226 as the rotor 10 comes up to speed. The magnet 224 becomes ineffective and the path through the contact is held open. As the rotor 10 comes up to speed, it falls into synchronism with the oscillatory voltage produced by the circuit of the transistor 211. The circuit is turned on and off by a conventional switch (not shown) in the circuit leading to the source 214.

The invention has been described in connection with certain specific embodiments thereof. It will be seen that the invention involves a hollow, air-core cylindrical stator and a magnetically polarized rotor mounted within the stator for rotation about an axis transversely intersecting the stator axis in response to excitation of the stator. The rotor is further supported for relative angular displacement between the stator and the rotor spin axis about the stator axis. Preferably, pick-off means is provided for sensing the displacement of the rotor relative to the stator axis. In a preferred embodiment, the rotor will be symmetrically mounted within the stator. However, absolute symmetry is not necessary for operation. The pick-off means provides for measurement of the angular displacement of the rotor axis relative to a given point of reference on the stator.

With the rotor mounted on the springs, as in the present embodiment, the system functions as a rate gyro wherein the voltages induced in the coils 60 and 61 normally are equal. When connected in opposition, a voltage null is produced when the rotor is at its reference position. Deviations from such null are then proportional to the magnitude of displacements of the rotor relative to the stator. The polarity of the unbalanced voltage is dependent upon the sense of the displacement.

It will be appreciated that the basic construction illustrated in the drawings will be suitable for directional gyroscopes and attitude gyroscopes. Therefore, in describing the invention in connection with specific embodiments thereof, it is not intended that the appended claims should be limited to the particular embodiments, but that further modifications may now suggest themselves to those skilled in the art and it is intended to cover such modifications as fall within the scope of the appended claims.

What is claimed is:
1. In a gyroscope, the improvement which comprises:
(a) a hollow non-magnetic cylindrical stator winding for producing a magnetic field symmetrical to the axis of said winding,
(b) a magnetically polarized rotor,
(c) a bracket extending through said stator winding supporting said rotor within said stator winding for rotation about an axis transversely intersecting the stator axis in response to stator winding excitation, and
(d) means for supporting said bracket for relative angular displacement between said stator winding and the rotor spin axis about said stator axis.

2. In a gyroscope, the improvement which comprises:
(a) coaxial field coil means of cylindrical form,
(b) a magnetically polarized rotor,
(c) a bracket extending through said coil means supporting said rotor within said coil means for rotation about an axis transversely intersecting the coil axis in response to excitation of said coil means, and
(d) means mounted in fixed relation at each end of said coil means for supporting said bracket for relative angular displacement between said coil means and said rotor relative to said coil axis.

3. In a gyroscope, the improvement which comprises:
(a) coaxial field coils of cylindrical form,
(b) a magnetically polarized rotor,
(c) a bracket extending into said coils for supporting said rotor for rotation about an axis transversely intersecting the coil axis in response to excitation of said coils, and
(d) gimbal means for supporting said bracket for relative angular displacement between said coils and the rotor spin axis relative to said coil axis.

4. In a gyroscope, the combination which comprises:
(a) a hollow solenoid for producing a magnetic field substantially symmetrical to the axis of said solenoid,
(b) a magnetically polarized rotor within said solenoid,
(c) a bracket for mounting said rotor inside said solenoid with the axis of said rotor perpendicular to the solenoid axis for driving said rotor in response to said magnetic field,
(d) means supporting said bracket from said solenoid to permit angular displacement between the rotor spin axis and said solenoid relative to said solenoid axis, and
(e) means for detecting said angular displacement.

5. A rate gyro which comprises:
(a) a hollow, non-magnetic, cylindrical stator,
(b) a magnetically polarized rotor,
(c) a bracket extending through said stator supporting said rotor within said stator for rotation on an axis transversely intersecting the stator axis in response to stator excitation, and
(d) a pair of crossed springs at each end of said stator, one extremity of each spring of each pair being connected to said bracket and the other extremity of each spring of each pair being connected in fixed relation with respect to said stator to permit relative angular displacement between said stator and said rotor relative to said stator axis.

6. A rate gyro which comprises:
(a) a hollow, non-magnetic, cylindrical stator for producing a magnetic field substantially symmetrical to the axis of said stator,
(b) a magnetically polarized rotor,
(c) a bracket extending through said stator supporting said rotor within said stator for rotation on an axis transversely intersecting the stator axis in response to stator excitation,
(d) a pair of crossed springs at each end of said stator, one extremity of each spring of each pair being connected to said bracket and the other extremity of each spring of each pair being connected in fixed relation with respect to said stator to permit relative angular displacement between said stator and said rotor relative to said stator axis, (e) a pair of series opposing sensing coils in the field of said stator on opposite sides of said stator axis, (f) a magnetic element for differentially varying the flux in said sensing coils, and (g) means for mounting one of said element and said coils on said bracket and the other of said element and said coils in fixed relation with respect to said stator for producing an output signal from said coils representative of said angular displacement.

7. A rate gyroscope which comprises:
(a) a short cylindrical rotor having diametrically opposing zones magnetically polarized in opposite senses,
(b) gimbal means for mounting said rotor to permit rotation thereof on its own axis and for angular displacement about a gimbal axis perpendicular to the rotor axis,
(c) a cylindrical solenoid,
(d) means for mounting said gimbal means with the gimbal axis aligned with the axis of said solenoid with said rotor positioned in the magnetic field produced by said solenoid to rotate said rotor on its spin axis, and
(e) means mounted on said gimbal means and on said solenoid for sensing relative angular displacement between said gimbal means and said solenoid with reference to the solenoid axis.

8. A gyroscope which comprises:
(a) a free-running multivibrator magnetically coupled by a pair of air-cored, cylindrically formed, center-tapped excitation windings,
(b) a magnetically polarized rotor,
(c) a bracket extending through said excitation windings supporting said rotor within said windings for rotation about an axis transversely intersecting the winding axis at a frequency synchronous with the frequency of said multivibrator.
(d) means for supporting said bracket relative to said windings for angular displacement of said windings on said winding axis relative to said rotor,
(e) a pair of sensing coils mounted on opposite sides of said winding axis adjacent to one end of said windings with their axes lying in a plane perpendicular to said winding axis, and
(f) means responsive to said angular displacement for differentially varying the reluctance in said coils in proportion to said displacement.

9. A gyroscope which comprises:
(a) a free-running multivibrator magnetically coupled by a pair of air-cored, cylindrically formed, center-tapped excitation windings,
(b) a magnetically polarized rotor,
(c) a bracket extending through said excitation windings supporting said rotor within said windings for rotation about an axis transversely intersecting the winding axis at a frequency synchronous with the frequency of said multivibrator,
(d) means for supporting said bracket relative to said windings for angular displacement of said windings on said winding axis relative to said rotor,
(e) a pair of series-opposing sensing coils spaced symmetrically of said winding axis in the field of said windings, and
(f) means responsive to angular displacement for differentially varying the reluctance in said coils in proportion to said displacement.

10. A gyroscope which comprises:
(a) a hollow non-magnetic cylindrical stator,
(b) a magnetically polarized rotor,
(c) a bracket extending through said stator supporting said rotor within said stator for rotation about an axis transversely intersecting the stator axis,
(d) gimbal means for supporting said bracket to permit relative angular displacement between said stator and the rotor spin axis about said stator axis, and
(e) magnetic means positioned adjacent the periphery of said stator for controlling the rest position of said rotor.

11. A gyroscope which comprises:
(a) a hollow non-magnetic cylindrical stator for producing a magnetic field substantially symmetrical to the axis of said stator,
(b) a magnetically polarized rotor,
(c) a bracket extending through said stator supporting said rotor within said stator for rotation about an axis transversely intersecting the stator axis,
(d) gimbal means for supporting said bracket to permit relative angular displacement between said stator and the rotor spin axis about said stator axis,
(e) magnetic means positioned adjacent the periphery of said stator for controlling the rest position of said rotor, and
(f) means controlled by said magnetic means to determine the initial polarity of the magnetic field in said stator for starting said rotor.

12. A gyroscope which comprises:
(a) a permanent magnet rotor,
(b) a field solenoid,
(c) means for mounting said rotor within said solenoid for free rotation on the spin axis of said rotor and to permit angular displacement between said solenoid and the rotor spin axis about the solenoid axis perpendicular to said spin axis,
(d) said solenoid having a center-tapped field winding and a center-tapped control winding,
(e) a D.C. voltage source connected at one terminal to the center tap of said field winding and at the other terminal to the center tap of said control winding,
(f) a pair of transistors having the emitters connected to said other terminal with the collector of one of said transistors connected to one extremity of said field winding and the collector of the other of said transistors connected to the other extremity of said field winding,
(g) means connecting the base of one of said transistors to one extremity of said control winding,
(h) means connecting the base of the other of said transistors to the other extremity of said control winding for producing current flow from said source first through one-half and then the other half of said field winding under triggered control of said transistor by induction from said rotor, and
(i) means for detecting said angular displacement.

13. A gyroscope which comprises:
(a) a free-running multivibrator including
(1) a pair of transistors,
(2) a cylindrical, air-cored, center-tapped field winding separately connected at each extremity to a collector electrode of one of said transistors,
(3) a center-tapped control winding coaxially wound with said field winding and connected at the center tap thereof to the emitter electrodes of both of said transistors and to the center tap of said field winding with separate connections from the extremities of said control winding to the bases of said transistors,
(b) a D.C. source and a master switch connected in series between said emitter electrodes and said center tap of said field winding for energizing said field winding upon closure of said master switch for the production of a magnetic field within said field winding which periodically reverses polarity at the frequency of said multivibrator,
(c) a magnetically polarized disk rotor,
(d) a bracket mounting said rotor in said magnetic field on an axis perpendicular to the axis of the windings for rotation in response to said magnetic field, (e) means for supporting said bracket for relative angular displacement between said windings and the rotor spin axis about the winding axis, (f) magnetic means supported in fixed relation with respect to said windings for controlling the position of said rotor at rest, (g) a starting control transistor, (h) a circuit extending between the base contact of one of said transistors and the negative terminal of said source and including a starting switch and the emitter-collector path of said starting control transistor, (i) a coupling between said magnetic means and said starting switch for opening and closing said switch synchronously with said rotor, (j) a circuit including a high resistance connected between the base of the second of said transistors and the emitter of said starting control transistor, and (k) a control circuit connected to the base of said starting control transistor for generating a base voltage which varies at a predetermined rate upon closure of said master switch to render said emitter-collector path non-conductive a predetermined time interval after initiation of rotation of said rotor.

14. A gyroscope which comprises:
(a) a free-running multivibrator including
   (1) a pair of transistors,
   (2) a cylindrical, air-cored, center-tapped field winding separately connected at each extremity to a collector electrode of one of said transistors,
   (3) a center-tapped control winding overlying said field winding and connected at the center tap thereof to the emitter electrodes of both of said transistors and to the center tap of said field winding with separate connections from the extremities of said control winding to the bases of said transistors,
(b) a D.C. source and a master switch connected in series between said emitter electrodes and said center tap of said field winding for energizing said field winding upon closure of said master switch for the production of a magnetic field within said field winding which periodically reverses polarity at the frequency of said multivibrator,
(c) a magnetically polarized disk rotor,
(d) a bracket mounting said rotor in said magnetic field on an axis perpendicular to the axis of the windings for rotation in response to said magnetic field,
(e) means for supporting said bracket for relative angular displacement between said windings and the rotor spin axis about the winding axis,
(f) magnetic means supported in fixed relation with respect to said windings for controlling the position of said rotor at rest,
(g) a starting control transistor,
(h) a circuit extending between the base contact of one of said transistors and the negative terminal of said source and including a starting switch and the emitter-collector path of said starting control transistor,
(i) a coupling between said magnetic means and said starting switch for opening and closing said switch synchronously with said rotor,
(j) a circuit including a high resistance connected between the base of the second of said transistors and the emitter of said starting control transistor, and
(k) a control circuit connected to the base of said starting control transistor for generating a base voltage which varies at a predetermined rate upon closure of said master switch to render said emitter-collector path non-conductive a predetermined time interval after initiation of rotation of said rotor.

15. In a gyroscope system, the improvement which comprises:
(a) a cylindrical field solenoid,
(b) a rotor symmetrical within said solenoid with the rotor axis perpendicular to the axis of said solenoid,
(c) gimbal means within said solenoid to support said rotor and permit the rotor axis to rotate about the solenoid axis,
(d) means for energizing said solenoid with alternating current for rotation of said rotor on the rotor axis in response to the field produced in said solenoid, and
(e) means for measuring angular displacement of the rotor axis relative to a point of reference on the solenoid.

16. A gyroscope which comprises:
(a) a free-running multivibrator magnetically coupled by a pair of air-cored, cylindrically formed, center-tapped excitation windings having a common axis,
(b) a magnetically polarized rotor,
(c) a bracket extending into said excitation windings supporting said rotor within said windings for rotation at a frequency synchronous with the frequency of said multivibrator about an axis which is transverse with respect to the winding axis,
(d) means for supporting said bracket relative to said windings for angular displacement of said bracket and said rotor on the winding axis, and
(e) means for measuring the angular position of said rotor relative to a point of reference on said gyroscope.

17. A gyroscope with a starting-driving circuit which comprises:
(a) an oscillator having a winding connected in series with a unidirectional current source and a switching element,
(b) a permanent magnet rotor mounted inside said winding and rotatably responsive to changes in the magnetic field in said winding,
(c) a permanent magnet pivotally mounted in the field of influence of the permanent magnet rotor adjacent to but outside said winding for oscillation about its pivot point,
(d) a circuit connected in parallel with said switching element including contacts which are synchronously opened and closed upon oscillation of said permanent magnet under the influence of said rotor at low speeds for slowly varying the field in said winding, and
(e) a magnetic member supported adjacent one pole of said permanent magnet for attracting said magnet into a fixed position to maintain said contacts open when said rotor is driven at high speeds under the influence of said oscillator.

18. A gyroscope with a starting-driving circuit which comprises:
(a) an oscillator having a winding connected in series with a unidirectional current source and a transistor switching element connected at a control terminal to a mid-point on said winding,
(b) a permanent magnet rotor mounted inside said winding and rotatably responsive to changes in the magnetic field in said winding,
(c) a permanent magnet pivotally mounted in the field of influence of the permanent magnet rotor adjacent to but outside said winding for oscillation about its pivot point,
(d) a circuit connected in parallel with said switching element including contacts which are synchronously opened and closed upon oscillation of said permanent magnet under the influence of said rotor at low speeds for slowly varying the field in said winding, and (e) a magnetic member supported adjacent one pole of said permanent magnet for attracting said magnet into a fixed position to maintain said contacts open when said rotor is driven at high speeds under the influence of said oscillator.

19. In a gyroscope system having a permanent magnet rotor rotatably supported inside a solenoid winding, the combination which comprises:
  (a) an oscillator circuit including said solenoid winding and a D.C. source connected at one terminal to one terminal on said winding,
  (b) a balanced magnet pivotally mounted in the field of influence of the permanent magnet rotor outside said solenoid,
  (c) a circuit leading from a second terminal of said solenoid winding to the second terminal of said D.C. source and including a pair of contacts, one of which is movable with said magnet and the other of which is fixed for oscillation in the field of said rotor at low rotor speed cyclically to open and close said contacts, and
  (d) a magnetic member adjacent to one pole of said magnet for maintaining said contacts open at high speeds of said rotor.

20. In a gyroscope system having a permanent magnet rotor rotatably supported inside a solenoid winding, the combination which comprises:
  (a) an oscillator circuit including said solenoid winding and a D.C. source connected at one terminal to one extremity of said winding with a transistor connected at its base to the second extremity of said winding, at its emitter to a mid-point on said winding, and at its collector to the second terminal of said source thereby normally to excite said winding at a frequency to drive said rotor at a normal speed,
  (b) a balanced magnet pivotally mounted in the field of influence of the permanent magnet rotor outside said solenoid,
  (c) a circuit leading from said second extremity of said winding to said second terminal of said D.C. source and including a pair of contacts, one of which is movable with said magnet and the other of which is fixed for oscillation in the field of said rotor at low rotor speed cyclically to open and close said contacts, and
  (d) a magnetic member adjacent to one pole of said magnet for maintaining said contacts open at high speeds of said rotor.

References Cited
UNITED STATES PATENTS

| | | | |
|---|---|---|---|
| 2,292,090 | 8/1942 | Reichel | 74—5.7 X |
| 2,798,995 | 7/1957 | McLean | 74—5.6 X |
| 2,963,912 | 12/1960 | Kawarada | 74—5.7 |
| 3,058,357 | 10/1962 | Fischel | 74—5.4 |
| 3,077,760 | 2/1963 | Packard | 74—5.4 X |

FRED C. MATTERN, Jr., *Primary Examiner.*

MILTON KAUFMAN, *Examiner.*

T. W. SHEAR, *Assistant Examiner.*